United States Patent
Itoh

(10) Patent No.: US 7,200,422 B2
(45) Date of Patent: Apr. 3, 2007

(54) RADIO TRANSMITTING/RECEIVING APPARATUS

(75) Inventor: Katsutoshi Itoh, Tokyo (JP)

(73) Assignee: Sony Ericsson Mobile Communications Japan, Inc. (JP)

( * ) Notice: Subject to any disclaimer, the term of this patent is extended or adjusted under 35 U.S.C. 154(b) by 290 days.

(21) Appl. No.: 10/499,203

(22) PCT Filed: Oct. 27, 2003

(86) PCT No.: PCT/JP03/13704

§ 371 (c)(1),
(2), (4) Date: Jun. 18, 2004

(87) PCT Pub. No.: WO2004/042961

PCT Pub. Date: May 21, 2004

(65) Prior Publication Data

US 2005/0085268 A1    Apr. 21, 2005

(30) Foreign Application Priority Data

Nov. 7, 2002  (JP) .............................. 2002-324555

(51) Int. Cl.
*H04B 1/38* (2006.01)
*H04M 1/00* (2006.01)
(52) U.S. Cl. .................... 455/562.1; 455/63.4; 455/69; 455/561
(58) Field of Classification Search ............... 455/63.4, 455/69, 101, 561, 562.1
See application file for complete search history.

(56) References Cited

U.S. PATENT DOCUMENTS 6,192,256 B1 *  2/2001  Whinnett ................. 455/562.1

FOREIGN PATENT DOCUMENTS

| JP | 08-065201 | 3/1996 |
| JP | 8-65201 A | 3/1996 |
| JP | 09-238098 | 9/1997 |
| JP | 9-238098 A | 9/1997 |
| JP | 2002-198875 | 7/2002 |
| JP | 2002-198875 A | 7/2002 |

OTHER PUBLICATIONS

International Search Report dated Feb. 10, 2004.
Japanese Office Action: Application: JP-2002-324555: Issue date: Jun. 1, 2006.

* cited by examiner

*Primary Examiner*—Nguyen T. Vo
*Assistant Examiner*—Tuan Pham
(74) *Attorney, Agent, or Firm*—Rader Fishman & Grauer PLLC; Ronald P. Kananen

(57) ABSTRACT

A channel monitor detects execution data quantities of first and second receiving circuits 3 and 4 which process audio and other line switching data or packet data transmitted from a plurality of base stations. Antenna weight values calculated by an antenna weight calculator 10 and supplied to the receiving circuits 3 and 4 are variably controlled on the basis of the execution data quantities of the receiving circuits. Consequently, it becomes possible to optimize the antenna weight values used for processing the data in the receiving circuits 3 and 4, hence improving the reception quality of a terminal device.

10 Claims, 14 Drawing Sheets

F I G. 6
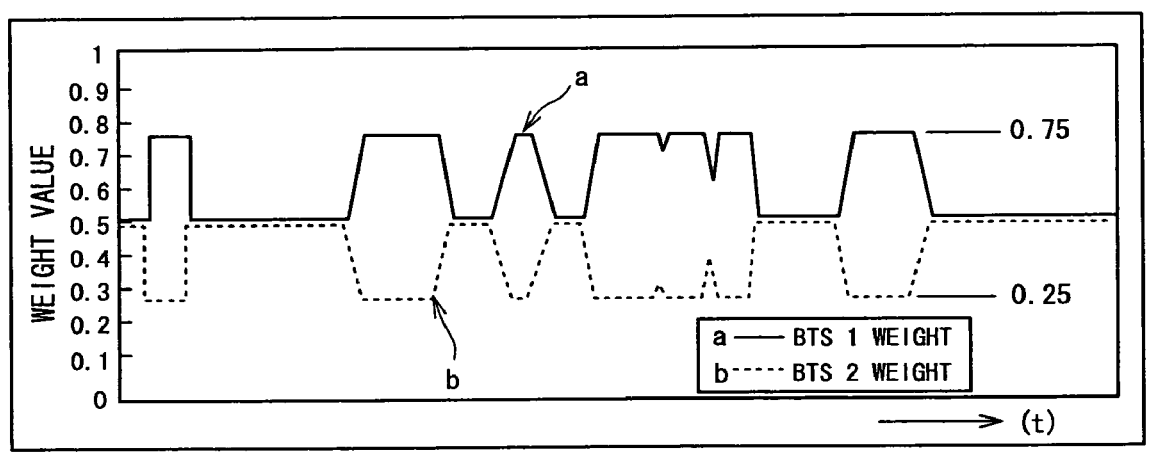

FIG. 11
A = 1+j    TIME ⟶
| ANTENNA 101 | A | A | A | A | A | A | A | A | A | A |
| ANTENNA 102 | A | −A | A | −A | A | −A | A | −A | A | −A |
FIG. 12
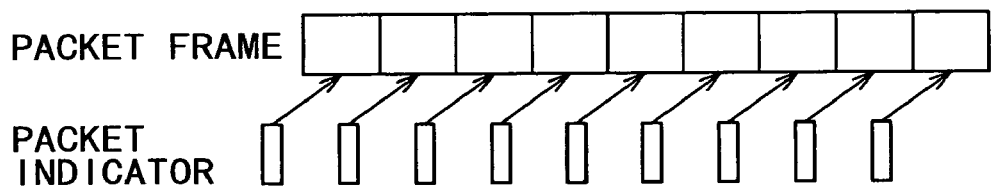
FIG. 13
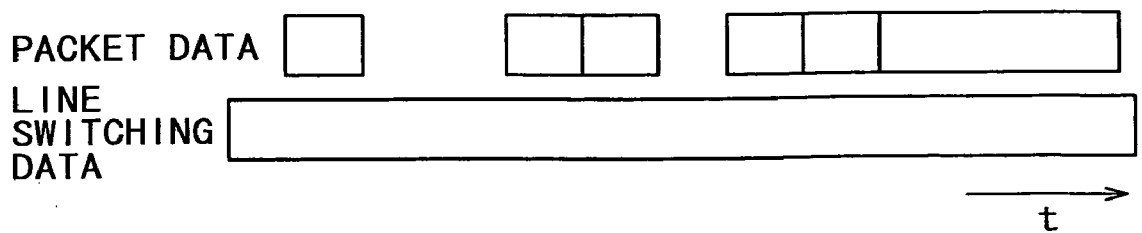

F I G. 1 4
| ANTENNA WEIGHT DATA | W1 | W2 |
|---|---|---|
| 00 | 1.0 | 1.0+j1.0 |
| 01 | 1.0 | 1.0−j1.0 |
| 10 | 1.0 | −1.0+j1.0 |
| 11 | 1.0 | −1.0−j1.0 |
F I G. 1 5
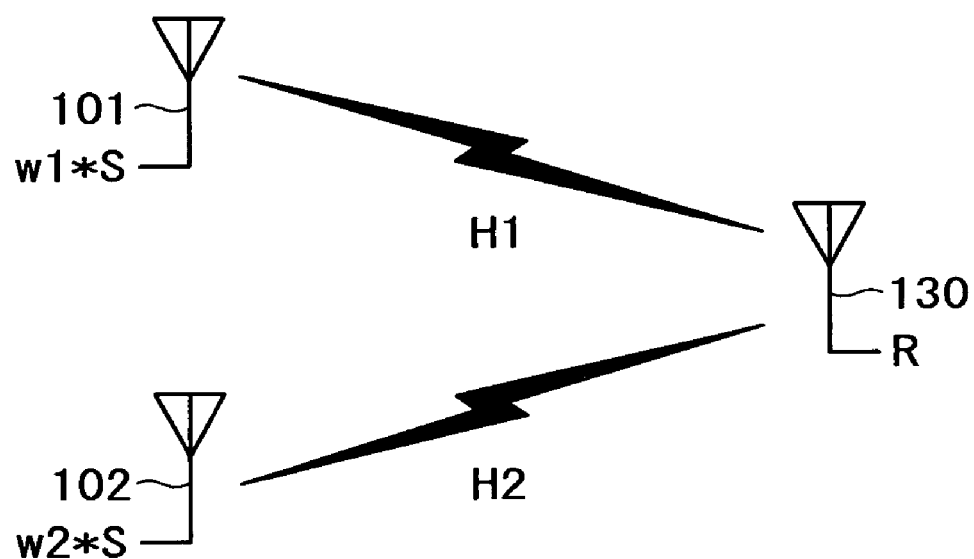

RADIO TRANSMITTING/RECEIVING APPARATUS

TECHNICAL FIELD

The present invention relates to a wireless transmitter-receiver device applicable to a terminal device conforming with a communication system which employs transmission antenna diversity for adapting the phase and the amplitude of each antenna output in accordance with the data fed back from the terminal device. More particularly, the present invention relates to a wireless transmitter-receiver device capable of improving the reception quality and so forth by efficiently calculating a proper antenna weight value even in a case where a channel of a different site diversity gain exists.

BACKGROUND ART

As a technical skill to improve the reception quality in a wireless communication system, there has been known heretofore a technique of transmission antenna diversity that transmits identical data from a plurality of antennas. Also known is a technique of closed-loop transmission antenna diversity where a base station decides the phases and amplitudes of signals outputted from a plurality of antennas in accordance with the data fed back from the receiver side.

In such a wireless communication system, the phase and the amplitude relative to each antenna where the received signal strength becomes maximum are detected from the propagation path characteristic obtained via each antenna and estimated on the receiver side (terminal device).

Subsequently the phase and the amplitude thus detected are quantized, and then the quantized data are sent to the transmitter side (base station).

On the transmitter side (base station), the phase and the amplitude of the signal to be transmitted from each antenna are adaptively controlled in accordance with the quantized data that represent the received phase and amplitude.

Such adaptive control is executed periodically and repeatedly on the transmitter side, so that the phase and amplitude of the signal to be transmitted can be optimized with respect to the propagation path characteristics that are fluctuated temporally, hence achieving improvement in the reception quality.

In order provide a better explanation of this wireless communication system, a concrete description will be given below of an exemplary case in which there are two transmitting antennas.

FIG. 10 is a block diagram showing a structure of a base station where a transmission antenna diversity is employed. In this diagram, the base station transmits a synchronous detection pilot signal and user data to a user.

The synchronous detection pilot signal transmitted to the user includes a first pilot signal (Pilot1) for transmission from an antenna 101 and a second pilot signal (Pilot2) for transmission from an antenna 102.

The first pilot signal and the second pilot signal are in an orthogonal relationship on the time base and are transmitted in a known symbol pattern, shown in FIG. 11, for example. The first pilot signal is diffused in a diffuser 103 into data of, e.g., a 4 MHz band in conformity with a diffusion code unique to the base station (sector), and then is supplied to a multiplexer 104. Similarly thereto, the second pilot signal is also diffused in a diffuser 105 into data of, e.g., a 4 MHz band in conformity with the same diffusion code as that used for diffusion of the first pilot signal, and then is supplied to a multiplexer 106.

It is supposed in this exemplary case that the user data includes two kinds, i.e., audio or other line switching data and packet data.

The line switching data are encoded in an encoder 107 for detecting and correcting any error in the wireless propagation path. Such an encoding process is executed by the use of, e.g., CRC (Cyclic Redundancy Check) in error detection, and a turbo code or a convolutional code in error correction.

The line switching data thus encoded are modulated in a modulator 108 by the use of BPSK, QPSK or QAM and then supplied to a multiplexer 109. Subsequently the line switching data are temporally multiplexed in the multiplexer 109 with a packet indicator that indicates, as shown in FIG. 12, the presence or absence of packet channel data and its rate.

The packet indicator may be mapped independently in some other channel by using another diffusion code.

The data thus multiplexed are diffused in a diffuser 110 by the diffusion code and the data channel identification code unique to the same base station, and then are supplied to a multiplexer 111.

Meanwhile, similarly to the line switching data, the packet data are also encoded in an encoder 112 and then are supplied to a diffuser 114 after being modulated in a modulator 113.

Here, as shown in FIG. 13, the packet data are discontinuous differently from the continuous line switching data. Therefore, in accordance with the presence or absence of the data and the packet data rate, the base station changes the value of the aforementioned indicator and inserts the changed value.

The diffuser 114 diffuses the modulated packet data by using the same diffusion code and packet data channel identification code as those used in the diffuser 103 and unique to the base station, and then supplies the diffused data to the multiplexer 111.

Subsequently, the multiplexer 111 forms antenna data by multiplexing the line switching data and the packet data diffused in the diffusers 110 and 114 by the respective identification codes, and supplies the antenna data respectively to antenna weight appliers 115 and 116.

The antenna weight applier 115 multiplies the antenna data by a coefficient for the antenna 101 and supplies the multiplied data to the multiplexer 104. The multiplexer 104 then multiplexes the multiplied antenna data with the diffused first pilot signal and supplies the multiplexed data to a transmitter-receiver 117. The transmitter-receiver 117 transmits the antenna data multiplexed with the first pilot signal to the user via the antenna 101.

The antenna weight applier 116 multiplies the antenna data by a coefficient for the antenna 102, and supplies the multiplied data to the multiplexer 106. The multiplexer 106 then multiplexes the multiplied antenna data with the diffused second pilot signal and supplies the multiplexed data to a transmitter-receiver 118. The transmitter-receiver 118 transmits the antenna data multiplexed with the second pilot signal to the user via the antenna 102.

The antenna data are thus transmitted from the antennas 101 and 102 respectively. In order to calculate the coefficients (antenna weight values) to be multiplied in the antenna weight appliers 115 and 116, the base station supplies, to an inverse diffuser 119, the data sent from the user and received by the transmitter-receiver 117 having a receiving function.

The inverse diffuser 119 executes a process of inverse diffusion of the data received from the user by using the diffusion code unique to the user, and then supplies the processed data to a demodulator 120. The demodulator 120 demodulates the data processed through inverse diffusion, and then supplies the demodulated data to an antenna weight data extractor 121. The antenna weight data extractor 121 extracts antenna weight data sent from the user per slot (e.g., per 0.667 msec), and supplies the extracted data to an antenna weight controller 122.

The antenna weight controller 122 maps the received bits and the values of the antenna weight data, and updates the antenna weight values of the antenna weight appliers 115 and 116 in accordance with the mapped values.

FIG. 14 shows an example of mutual correspondence between the received bits and the antenna weight values. This example assumes a case where 2-bit antenna weight data of "00" to "11" is transmitted per slot from the user's terminal.

For example, in a case where the antenna weight data "00" has been extracted, the antenna weight value (w1) of the antenna weight applier 115 is controlled to "1.0", and the antenna weight value (w2) of the antenna weight applier 116 is controlled to "1.0+j1.0". Similarly, in a case where the antenna weight data "11" has been extracted, the antenna weight value (w1) of the antenna weight applier 115 is controlled to "1.0", and the antenna weight value (w2) of the antenna weight applier 116 is controlled to "−1.0−j1.0".

When the output of the multiplexer 111 is "S", the antenna weight value of the antenna weight applier 115 is "w1" and the antenna weight value of the antenna weight applier 116 is "w2" as mentioned, data of a value "w1*S" is outputted from the antenna 101 while data of a value "w2*S" is outputted from the antenna 102.

Supposing now that, as shown in FIG. 15, when the propagation path characteristics between the antennas 101, 102 and the user's terminal 130 are H1 and H2 (complex vectors) respectively, the data R received by the user's terminal 130 is expressed as $$R=(w1H1+w2H2)*S \qquad \text{Eq. 1}$$

Next, FIG. 16 is a block diagram showing a user's terminal device to a base station where a transmission antenna diversity is employed. In this diagram, the antenna data transmitted from the base station via the antennas 101 and 102 are received by a transmitter-receiver 131 via the antenna 130 of the user's terminal device, and then are supplied to inverse diffusers 132 and 133.

The inverse diffuser 132 restores the antenna data by the use of a pilot data diffusion code and supplies the restored data to a pilot decoder 134. The restored data is a mixture of the data component obtained from the antenna 101 of the base station and the data component from the antenna 102, as represented by the following equations.

$$P[n]=(AH1+AH2) \qquad \text{Eq. 2}$$

$$P[n+1]=(AH1-AH2) \qquad \text{Eq. 3}$$

Therefore, the pilot decoder 134 estimates the propagation path characteristics H1 and H2 between the antennas 101 and 102 as follows to thereby calculate the estimated values α and β of the propagation path characteristics.

$$\alpha=H1=(P[n]+P[n+1])*A \qquad \text{Eq. 4}$$

$$\beta=H2=(P[n]-P[n+1])*A \qquad \text{Eq. 5}$$

In calculating the estimated values of the propagation path characteristics, there may be a case of using the average of several samples so as to suppress any harmful influence of noises. The pilot decoder 134 supplies the estimated values α and β of the propagation path characteristics thus calculated to an antenna weight calculator 135 and a phase corrector 136 respectively.

On the basis of the estimated values α and β of the propagation path characteristics, the antenna weight calculator 135 selects, from the entire antenna weight values shown in FIG. 14, the antenna weight values (w1, w2) which are the most satisfactory to maximize the received data R in Eq. 1 (R=(w1H1+w2H2)*S). Then, the calculator 135 supplies 2-bit antenna weight data, which correspond to the selected antenna weight values, to an antenna weight data inserter 140.

The antenna weight data inserter 140 inserts the 2-bit antenna weight data through temporal multiplexing into the transmission user data encoded in an encoder 139, so that the transmission user data with the 2-bit antenna weight data attached thereto are transmitted to the aforementioned base station from the antenna 130 via a modulator 141, a diffuser 142 and the transmitter-receiver 131.

Meanwhile the phase corrector 136 calculates decode antenna data S according to Eq. 6 shown below on the basis of the antenna data restored in the inverse diffuser 133 (i.e., antenna data "R=(w1H1+w2H2)*S" in Eq. 1) and also on the basis of the estimated values α and β of the propagation path characteristics calculated according to Eqs. 4 and 5, and the antenna weight data w1 and w2 indicated to the base station.

$$S=R*(w1\alpha+w2) \qquad \text{Eq. 6}$$

The decode antenna data thus calculated are demodulated in a demodulator 143 and are then decoded in a decoder 144 so that the decoded data are received as user data.

In the above description of the user's terminal device, the explained operation relates to the receiving circuit of merely one channel. When such reception is performed through a plurality of channels in the terminal device, a group of inverse diffuser 133, phase corrector 136, modulator 143 and decoder 144 may be provided for each of the channels, and the respective operations may be performed in parallel in the plural channels. In such a case, the diffusion code used for inverse diffusion is unique to each relevant channel.

The explanation given above is concerned with an exemplary case where the user's terminal device communicates with a single base station. There is also known a mobile communication system employing technology of site diversity (soft handoff) where, as shown in FIG. 17, identical data are transmitted from a plurality of base stations and are combined in a user's terminal device 130.

FIG. 18 is a block diagram showing the structure of a terminal device in a mobile communication system which employs such site diversity. The terminal device shown in FIG. 18 represents an example having two-channel receiving circuits 151 and 152 so as to be capable of communicating with two base stations.

In the case of this terminal device, there is included a combiner 153 which combines the decode antenna data obtained from the two-channel receiving circuits 151, 152 and then supplies the combined antenna data to a demodulator 143.

Also, in this terminal device, the receiving circuits 151 and 152 calculate estimated values α1, β1 and α2, β2 of the propagation path characteristics respectively between these circuits and the base stations in communication, and then supply the estimated values to an antenna weight calculator 135.

In the case of this mobile communication system employing such site diversity, the antenna weight values selectable by the terminal device need to be selected in consideration of the site diversity gain.

More specifically, it is necessary to select the proper antenna weight data values that are the most satisfactory to maximize the antenna data R calculated according to Eq. 7 given below.

$$R=(w1(H1\text{-}1+H1\text{-}2+H1\text{-}3\ldots H1\text{-}N)+w2(H2\text{-}1+H2\text{-}2+H2\text{-}3\ldots H2\text{-}N))*S \quad \text{Eq. 7}$$

Therefore, in the case of this terminal device, the receiving circuits 151 and 152 calculate the estimated values $\alpha 1$, $\beta 1$ and $\alpha 2$, $\beta 2$ of the propagation path characteristics respectively between the antennas. On the basis of the estimated values $\alpha 1$, $\beta 1$, $\alpha 2$, $\beta 2$ of the propagation path characteristics in the channels, the antenna weight calculator 135 selects the antenna weight values w1 and w2 that are the most satisfactory to maximize the received data R obtained according to Eq. 8 given below.

$$R=(w1(H1\text{-}1+H1\text{-}2)+w2(H2\text{-}1+H2\text{-}2))*S \quad \text{Eq. 8}$$

A known diversity receiving device and a control method thereof are disclosed in International Pamphlet Laid-open No. 97/20400.

However, in a mobile communication system where data of plural channels are transmitted simultaneously from base stations to a user's terminal device as in a system employing site diversity such as W-CDMA (Wideband Code Division Multiple Access) or CDMA2000 for example, a channel with a site diversity gain and a channel without any site diversity gain may occasionally co-exist.

That is, in the mobile communication system mentioned above, as shown in FIG. 19, audio and other line switching data of a data channel 1 are transmitted simultaneously from two base stations to a user's terminal device, while packet data of a data channel 2 are transmitted from only one base station to the user's terminal device.

Consequently, there arises a problem that, if the data of the channel without any site diversity gain are received by using the antenna weight value calculated for the other channel with the site diversity gain, the receiving data characteristics of the channel without any site diversity gain are deteriorated. To the contrary, if the data of the channel with the site diversity gain are received by using the antenna weight value calculated for the channel without any site diversity gain, the receiving data characteristics of the channel with the site diversity gain are deteriorated.

The present invention has been accomplished in view of the problems mentioned above. An object of the invention resides in providing a wireless transmitter-receiver device that is capable of assigning an optimal antenna weight value to each channel of a terminal conforming to site diversity for communication with a plurality of base stations.

DISCLOSURE OF INVENTION

The present invention selects an optimal antenna weight value in accordance with the quantity of data restored in each receiving circuit or with the state of packet data, and assigns the selected weight value to each receiving circuit.

BRIEF DESCRIPTION OF DRAWINGS

FIG. 6 is a diagram showing an example of weight values corresponding to the first and second receiving groups provided in the mobile telephone of the first embodiment;

FIG. 11 is a diagram showing a symbol pattern of synchronous detection pilot signals;

FIG. 12 is a diagram showing an indicator inserted in packet data;

FIG. 13 is a diagram showing line switching data transmitted continuously and packet data transmitted intermittently;

FIG. 14 is a diagram showing an example of mutual correspondence between received bits and antenna weight values;

FIG. 15 is a diagram showing propagation path characteristics of data transmitted from plural antennas of base stations;

BEST MODE FOR CARRYING OUT THE INVENTION

First Embodiment

The wireless communication device of the present invention is applicable to a cellular or mobile telephone adapted for a mobile communication system employing site diversity, such as W-CDMA (Wideband Code Division Multiple Access) or CDMA2000.

In such a mobile communication system, audio and other line switching data from a plurality of base stations are transmitted continuously, while packet data from a single base station are transmitted in bursts (intermittently).

Viewing the data attributed differences between the line switching data and the packet data, the mobile telephone representing the first embodiment of the present invention is contrived so that, when the packet data are existent in the propagation path, the antenna weight value for processing the packet data is selected to be used with regard to the propagation path, but when none of the packet data exists in the propagation path, the antenna weight value for processing the line switching data is assigned to be used in accordance with the data quantity in each propagation path.

[Structure of First Embodiment]

Figure 1:
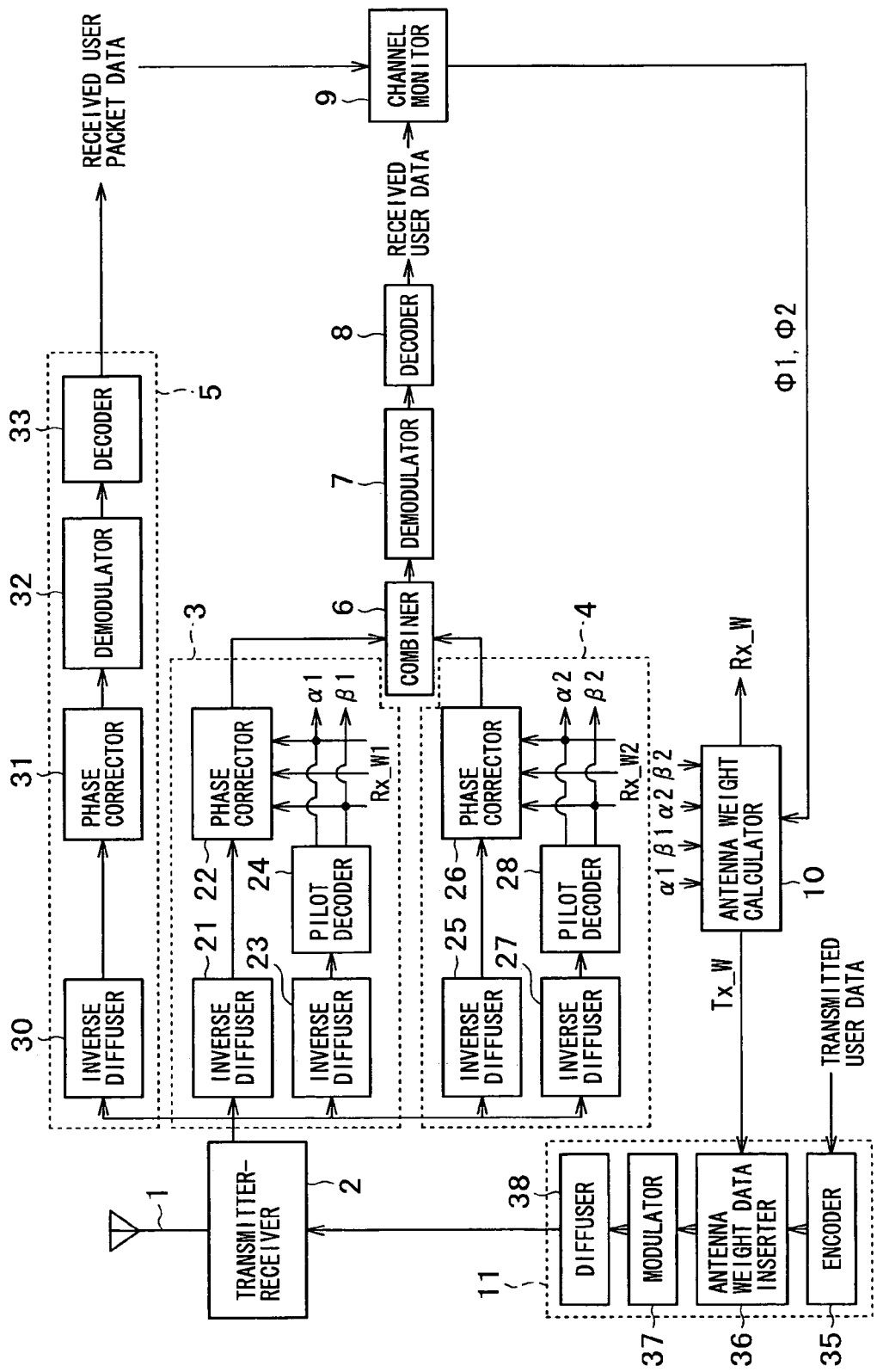
FIG. 1 is a block diagram of a mobile telephone representing a first embodiment where the present invention is applied.

FIG. 1 shows a block diagram of the mobile telephone representing the first embodiment of the present invention. As is obvious from FIG. 1, the mobile telephone of this embodiment includes an antenna 1 and a transmitter-receiver 2 for transmission and/or reception of data; a first receiving circuit 3 for restoring line switching data or packet data transmitted from, e.g., a first base station; and a second receiving circuit 4 for restoring line switching data transmitted from a second base station.

In order to ensure better understanding of this system, the following explanation assumes that the packet data are restored in the first receiving circuit 3, while the audio and other line switching data are restored in the first receiving circuit 3 and the second receiving circuit 4.

This mobile telephone also has a third receiving circuit 5 used exclusively for restoration of packet data transmitted from one base station, and a combiner 6 for combining the data received by the first and second receiving circuits 3 and 4.

The mobile telephone further has a demodulator 7 for executing predetermined demodulation of the combined data formed in the combiner 6, and a decoder 8 for decoding the demodulated combined data and outputting the decoded data as received user data.

The mobile telephone further has a channel monitor 9 for calculating a "weight value" to calculate an "antenna weight value" used in the first receiving circuit 3 for restoration of the packet data, on the basis of the execution data quantity of the received user packet data obtained from the third receiving circuit 5 provided to receive the packet data exclusively, and also for calculating "weight values" to calculate "antenna weight values" used in the first and second receiving circuits 3 and 4 for restoration of the line switching data, on the basis of the respective execution data quantities of the line switching data received by the first and second receiving circuits 3 and 4. The mobile telephone further has an antenna weight calculator 10 for calculating an antenna weight value (Rx_W) on the basis of the estimated values of propagation path characteristics (undermentioned $\alpha 1$, $\beta 1$, $\alpha 2$, $\beta 2$) calculated in the first and second receiving circuits 3 and 4, and also on the basis of the weight values (undermentioned $\phi 1$, $\phi 2$) obtained from the channel monitor 9, and then supplying the antenna weight value (Rx_W) to the first and second receiving circuit 3 and 4; and a transmitting circuit 11 for inserting antenna weight data (Tx_W) of the value obtained from the antenna weight calculator 10, into the data to be transmitted by the user, and then transmitting the entire data to the base station via the transmitter-receiver 2 and the antenna 1.

In the mobile communication system employing site diversity, the base station transmits, together with the data, a synchronous detection pilot signal to the mobile telephone so as to perform synchronous detection of the data.

For this purpose, the first receiving circuit 3 of the mobile telephone has an inverse diffuser 21 for executing a process of inverse diffusion of the received data; a phase corrector 22 for executing a process of phase correction of the inverse-diffused data on the basis of the estimated values $\alpha 1$ and $\beta 1$ of the propagation path characteristics obtained from the pilot decoder 24 and also on the basis of the antenna weight value Rx_W obtained from the antenna weight calculator 10; an inverse diffuser 23 for executing a process of inverse diffusion of the synchronous detection pilot signal; and a pilot decoder 24 for calculating the estimated values $\alpha 1$ and $\beta 1$ of the propagation path characteristics on the basis of the inverse-diffused synchronous detection pilot signal and then supplying the above estimated values to the phase corrector 22.

Similarly, the second receiving circuit 4 has an inverse diffuser 25 for executing a process of inverse diffusion of the received data; a phase corrector 26 for executing a process of phase correction of the inverse-diffused data on the basis of the estimated values $\alpha 2$ and $\beta 2$ of the propagation path characteristics obtained from the pilot decoder 28 and also on the basis of the antenna weight value Rx_W obtained from the antenna weight calculator 10; an inverse diffuser 27 for executing a process of inverse diffusion of the synchronous detection pilot signal; and a pilot decoder 28 for calculating the estimated values $\alpha 2$ and $\beta 2$ of the propagation path characteristics on the basis of the inverse-diffused synchronous detection pilot signal and then supplying the above estimated values to the phase corrector 26.

The third receiving circuit 5 used exclusively to receive the packet data has an inverse diffuser 30 for executing a process of inverse diffusion of the received packet data; a phase corrector 31 for executing a process of phase correction of the inverse-diffused packet data; a demodulator 32 for demodulating the phase-corrected packet data; and a decoder 33 for decoding the demodulated packet data and supplying the decoded packet data to the channel monitor 9.

The transmitting circuit 11 has an encoder 35 for encoding the user data to be transmitted; an antenna weight data inserter 36 for inserting into the encoded user data the antenna weight data (Tx_W) obtained from the antenna weight calculator 10; a modulator 37 for modulating the user data inclusive of the antenna weight data inserted therein; and a diffuser 38 for diffusing the modulated user data through the use of a diffusion code and then transmitting the diffused user data to the base station via the transmitter-receiver 2 and the antenna 1.

[Characteristic Operation of First Embodiment]

In the mobile telephone of the first embodiment having the above-described structure, when the line switching data transmitted from the plurality of base stations have been received, the line switching data are restored by the first and second receiving circuits 3 and 4 as mentioned. Therefore, upon reception of the line switching data, the channel monitor 9 detects the respective execution data quantities of the line switching data restored in the first and second receiving circuits 3 and 4, and then controls the respective antenna weight values, which are used in the receiving circuits 3 and 4, on the basis of the detected execution data quantities.

Meanwhile, when the packet data transmitted from one base station have been received, the packet data are restored in the first receiving circuit 3 as mentioned. Therefore, upon reception of the line switching data, the channel monitor 9 detects the execution data quantity of the packet data restored in the third receiving circuit S provided to receive the packet data exclusively, and then controls the antenna weight value, which is used in the first receiving circuit 3 for restoration of the packet data, on the basis of the detected execution data quantity of the packet data, and also controls the antenna weight value of the second receiving circuit 4 which restores the line switching data in parallel.

[Detection of Execution Data Quantity]

Figure 2:
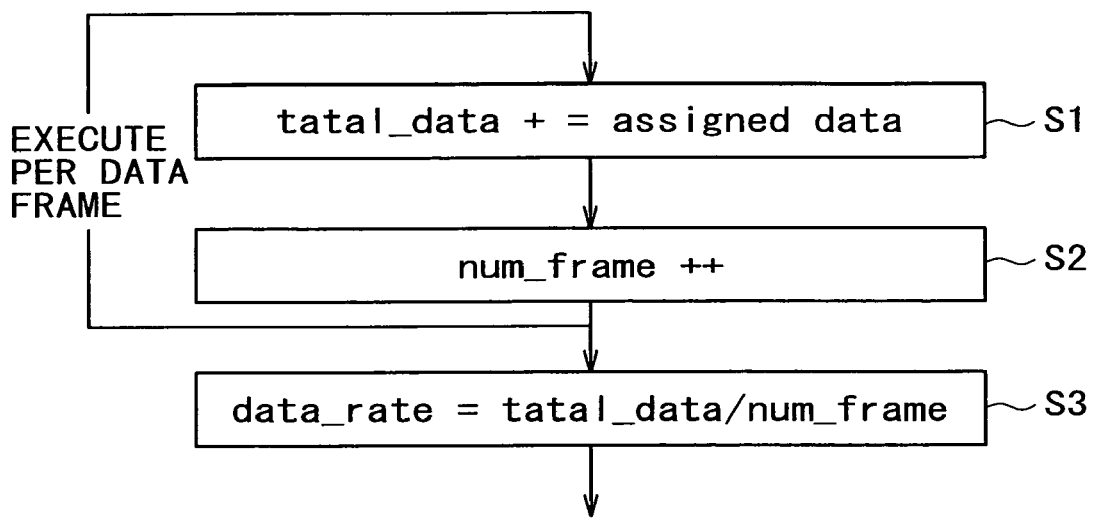
FIG. 2 is a flowchart showing a flow of the operation to detect an execution data quantity in a channel monitor provided in the mobile telephone of the first embodiment.

FIG. 2 is a flowchart showing a flow of the operation performed in the channel monitor 9 to detect the execution data quantity. The channel monitor 9 executes, in regard to each of the receiving circuits 3 and 4, the operation of detecting the execution data quantity as shown in the flowchart of FIG. 2.

In the case of a mobile communication system employing a site diversity such as W-CDMA (Wideband Code Division Multiple Access) or CDMA2000, the data from its base station are transmitted per frame. Therefore, first at step S1, the channel monitor 9 detects the quantity of the data existing in each frame, and then detects the total data quantity by accumulating the data quantity detected per frame (total_data+=assigned data).

Next at step S2, the channel monitor 9 detects the total number of the frames used for detection of the total data quantity (num_frame++).

Subsequently at step S3, the channel monitor 9 divides the total data quantity detected at step S1 by the total number of the frames detected at step S2, hence calculating the execution data quantity (data_rate) of the relevant channel (=first receiving circuit 3 or second receiving circuit 4) (data_rate=total_data/num_frame).

More specifically, when the data being received currently are the line switching data, the channel monitor 9 calculates the execution data quantity of the line switching data in each of the receiving circuits 3 and 4 on the basis of the line switching data restored by the first and second receiving circuits 3 and 4.

Meanwhile, in case the data being received currently are the packet data, the channel monitor 9 calculates the execution data quantity of the packet data on the basis of the packet data restored by the third receiving circuit 5 provided exclusively for the packet data.

[Calculation of Weight Data]

Figure 3:
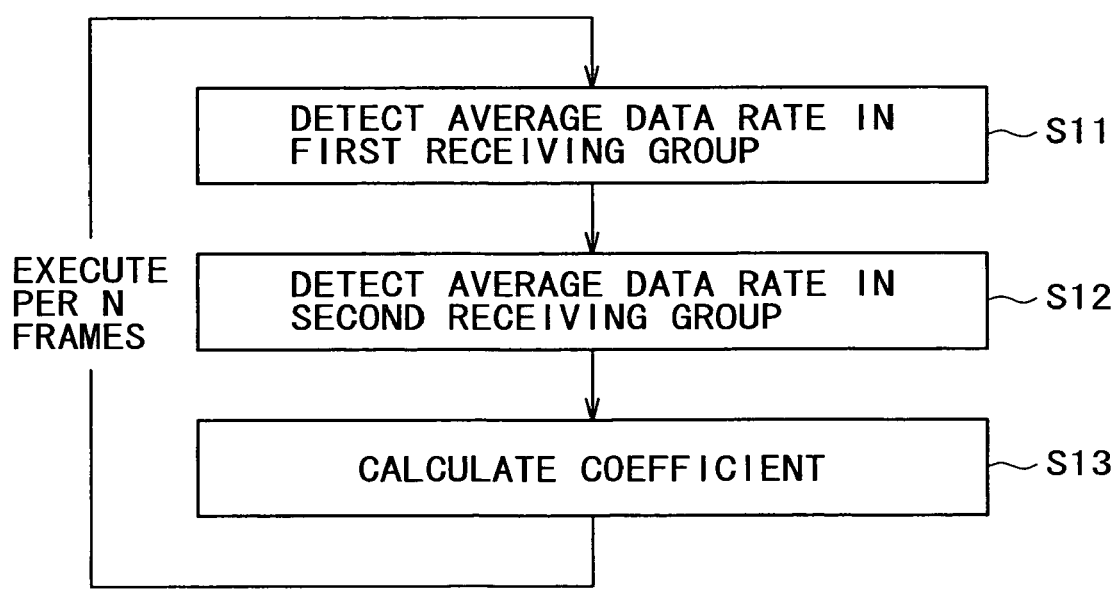
FIG. 3 is a flowchart showing a flow of the operation to calculate an antenna weight value in an antenna weight calculator provided in the mobile telephone of the first embodiment.

Next, the flowchart of FIG. 3 shows a flow of the operation to calculate an "antenna weight value".

In the flowchart of FIG. 3, when the execution data quantity corresponding to the first receiving circuit 3 have been calculated as explained by using the flowchart of FIG. 2, the channel monitor 9 detects, at step S11 in the flowchart of FIG. 3, an average rate of the execution data quantities over predetermined plural frames in the first receiving circuit 3. Similarly, at step S12, the channel monitor 9 detects an average rate of the execution data quantities over a predetermined plurality of frames in the second receiving circuit 4.

Figures 4, 5:
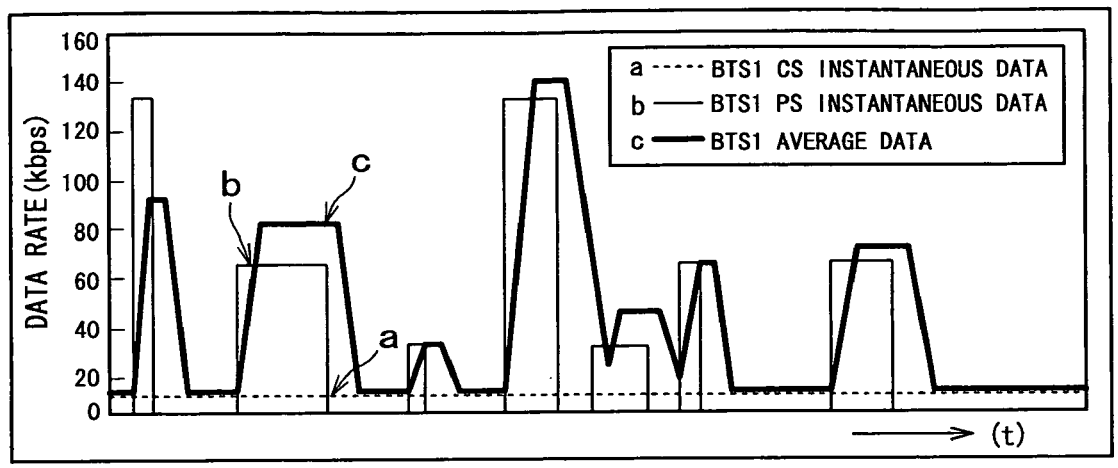
FIG. 4 is a diagram showing an example of calculating the average rate of execution data quantities corresponding to a first receiving group provided in the mobile telephone of the first embodiment.
FIG. 5 is a diagram showing an example of calculating the average rate of execution data quantities corresponding to a second receiving group provided in the mobile telephone of the first embodiment.

FIG. 4 shows an example of the relationship among the line switching data (BTS1 CS instantaneous data) and the packet data (BTS1 PS instantaneous data) transmitted from the first base station (BTS1) and processed in the first receiving circuit 3, and the average rate (BTS1 average data) of the execution data quantities corresponding to the first receiving circuit 3.

FIG. 5 shows an example of the relationship among the line switching data (BTS2 CS instantaneous data) and the packet data (BTS2 PS instantaneous data) transmitted from the second base station (BTS2) and processed in the second receiving circuit 4, and the average rate (BTS2 average data) of the execution data quantities corresponding to the second receiving circuit 4.

FIGS. 4 and 5 are grounded on an assumption that the line switching data (CS) are transmitted (soft handover) from the first and second base stations at a transmission speed of 12.2 kbps for example, and the packet data (PS) are transmitted (in bursts) from each base station at a maximum transmission speed of 384 kbps, for example.

FIG. 4 shows an example where the packet data transmitted from the first base station are processed in the first receiving circuit 3. Therefore, the rate of the line switching data (CS) denoted by a dotted line a in FIG. 4 is kept steady approximately at 10 kbps, but the rate of the packet data (PS) denoted by a thin line b in FIG. 4 appears intermittently in conformity with the rate corresponding to each packet. When an average rate is calculated from the line switching data of such a steady rate and the packet data appearing intermittently at the rate corresponding to each packet, it signifies that the average rate denoted by a thick line c in FIG. 4 is obtained (at the aforementioned step S11).

Meanwhile, FIG. 5 shows an example where the line switching data transmitted from the second base station are processed in the second receiving circuit 4. In this case, none of the packet data are transmitted from the second base station.

Therefore, the rate of the line switching data (CS) denoted by a dotted line a in FIG. 5 is kept steady at approximately 12 kbps, but the rate of the packet data (PS) denoted by a thin line b in FIG. 5 is "0 (no data)". When an average rate is calculated from the line switching data of such a steady rate and the packet data of a data rate "0", it indicates that the average rate denoted by a thick line c in FIG. 5 is obtained (at step S12).

Subsequently at step S13 in the flowchart of FIG. 3, the channel monitor 9 executes the following operation on the basis of each average rate obtained at steps S11 and S12, thereby calculating "weight value $\phi1$=BTS1_weight" used in calculation of the "antenna weight value" of the first receiving circuit 3 by the antenna weight calculator 10, and also calculating "weight value $\phi2$=BTS2_weight" used in calculation of the "antenna weight value" of the second receiving circuit 4.

In the following equations, the average rate corresponding to the first receiving circuit 3 is expressed as "BTS1_avg_rate", and the average rate corresponding to the second receiving circuit 4 is expressed as "BTS2_avg_rate".

$$\phi = BTS1\_weight$$
$$= .5 * (1 + (BTS2\_avg\_rate / (BTS1\_avg\_rate + BTS2\_avg\_rate))$$
$$\phi2 = BTS2\_weight = 1.0 - BTS1\_weight$$

The channel monitor 9 calculates the weight values $\phi1$ and $\phi2$ according to the above equations, and then supplies these values to the antenna weight calculator 10.

FIG. 6 shows examples of the weight values $\phi1$ and $\phi2$ thus calculated. In FIG. 6, a solid line a denotes transition of the weight value $\phi1$ (=BTS1_weight) for the first receiving circuit 3, and a dotted line b denotes transition of the weight value $\phi2$ for the second receiving circuit 4.

The channel monitor 9 is provided with a minimum operator which adjusts the weight values $\phi1$ and $\phi2$ in such a manner that these values calculated according to the above equations do not become "over 0.75, under 0.25", for example.

[Calculation of Antenna Weight Values]

Next, on the basis of the calculated weight values $\phi 1$, $\phi 2$, the estimated values $\alpha 1$, $\beta 1$ of the propagation path characteristics obtained from the pilot decoder 24 of the first receiving circuit 3, and the estimated values $\alpha 2$, $\beta 2$ of the propagation path characteristics obtained from the pilot decoder 28 of the second receiving circuit 4, the antenna weight calculator 10 selects proper antenna weight values W1 and W2 so that the received data R according to the following equation becomes maximum (in reception strength).

$$R = (\phi 1 W1(\alpha 1 + \beta 1) + \phi 2 W2(\alpha 2 + \beta 2))^* S$$

Then the antenna weight calculator 10 supplies the antenna weight value W1, which has been selected according to the above equation, to the phase corrector 22 of the first receiving circuit 3, and also supplies the antenna weight value W2 to the phase corrector 26 of the second receiving circuit 4. (These processes are represented by Rx_W1 and Rx_W2 in FIG. 1).

The antenna weight values obtained from the antenna weight calculator 10 are inserted into the transmission user data by the transmitting circuit 11 shown in FIG. 1 and are then fed back to the base station.

Subsequently, the phase corrector 22 of the first receiving circuit 3 executes a process of phase correction for the data obtained from the inverse diffuser 21, on the basis of the estimated values $\alpha 1$, $\beta 1$ of the propagation path characteristics from the pilot decoder 24 and also the antenna weight value W1 of the first receiving circuit 3 from the antenna weight calculator 10.

Similarly, the phase corrector 26 of the second receiving circuit 4 executes a phase correction process for the data obtained from the inverse diffuser 21, on the basis of the estimated values $\alpha 2$, $\beta 2$ of the propagation path characteristics from the pilot decoder 28 and also the antenna weight value W2 of the second receiving circuit 4 from the antenna weight calculator 10.

As described, the antenna weight values W1 and W2 supplied to the phase correctors 22 and 26 correspond respectively to the execution data quantities processed in the receiving circuits 3 and 4, thereby optimizing the phases and the amplitudes of the data transmitted from the first and second base stations and restored by the receiving circuits 3 and 4. Consequently, it becomes possible to optimize the phases and the amplitudes of the received user data decoded by the combiner 6, the demodulator 7 and the decoder 8.

[Effects of First Embodiment]

As is obvious from the explanation given hereinabove, when receiving the data from the plurality of base stations via the plural receiving circuits of the mobile telephone and decoding the received data, the mobile telephone of the first embodiment detects, in the channel monitor 9, the execution data quantity to be processed by each receiving circuit, and then variably controls the antenna weight value of the data of each receiving circuit on the basis of the execution data quantity thus detected.

As a result, it becomes possible to use the antenna weight value corresponding to the execution data quantity of the data to be processed in each receiving circuit, hence optimizing the phase and the amplitude of the received user data to be restored by each receiving circuit. Consequently, the reception quality can be improved in accordance with the propagation path characteristics that fluctuate temporally.

Second Embodiment

Next, an explanation will be given of a mobile telephone representing a second embodiment of the present invention. The foregoing mobile telephone of the first embodiment is capable of variably controlling the antenna weight values on the basis of the execution data quantities of the data processed by the receiving circuits 3 and 4. However, the mobile telephone of this second embodiment is so contrived as to variably control the antenna weight values of the receiving circuits 3 and 4 in accordance with "the state of the packet data".

[Structure of Second Embodiment]

Figure 7:
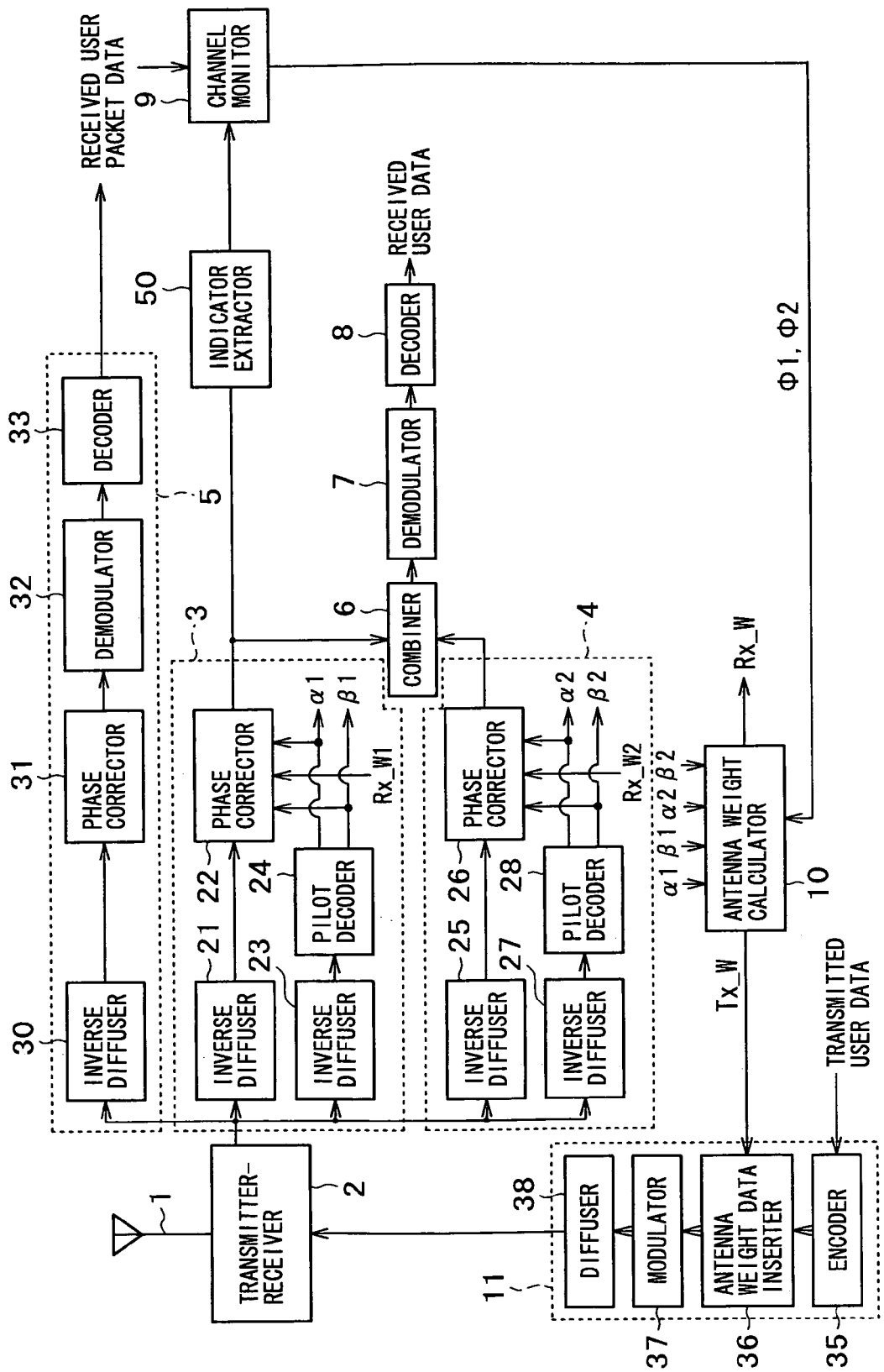
FIG. 7 is a block diagram of a mobile telephone representing a second embodiment where the present invention is applied.

The mobile telephone of the second embodiment has an indicator extractor 50, as shown in FIG. 7. Upon reception of the packet data, this indicator extractor 50 inputs the data from a first receiving circuit which executes a process of restoring the packet data. The data indicating the state of the packet data and outputted from the indicator extractor 50 is supplied to a channel monitor 9.

On the basis of the data indicating the state of the packet data and supplied from the indicator extractor 50, the channel monitor 9 forms the aforementioned weight values $\phi 1$ and $\phi 2$ (=BTS1_weight, BTS2_weight), and then supplies these weight values to the antenna weight calculator 10.

In FIG. 7, component parts identical in operation with those in the foregoing mobile telephone of the first embodiment are denoted by the same reference numerals or numerals. Therefore, with regard to component parts denoted in FIG. 7 by the same reference numerals or symbols as those in the mobile telephone of the first embodiment, reference is made to the explanation already provided in connection with the aforementioned first embodiment.

[Operation of Second Embodiment]

In the packet data transmitted and received in the mobile communication system employing a site diversity such as W-CDMA or CDMA2000, there is inserted an indicator which signifies the presence or absence of data in the packet.

Therefore, upon reception of the packet data, the indicator extractor 50 extracts the indicator from the received packet data and then supplies the indicator to the channel monitor 9.

Meanwhile, in response to the input packet data, the decoder 33 of the third receiving circuit 5 forms a flag which signifies whether the input packet data have been properly received (decoded) or not, and then supplies the flag to the channel monitor 9.

Upon detection of the reception of the packet data according to the indicator, the channel monitor 9 sets a predetermined great value to the weight value $\phi 1$ for evaluating the antenna weight value W1 used in the receiving circuit (in this case, the first receiving circuit 3) which processes the packet data.

Utilizing the attributes of the packet data transmitted intermittently, the channel monitor 9 holds, at the predetermined great value, the weight value $\phi 1$ for evaluating the antenna weight value to process the packet data during a predetermined time period after detection of the reception of the packet data according to the indicator.

Meanwhile, in case the packet data have not been received properly, a request for re-transmission of the packet data is sent from the mobile telephone to the base station, and then the packet data not received properly are re-transmitted from the base station to the mobile telephone.

Therefore, when the decoder 33 supplies a flag signifying that proper reception of the packet data has not occurred, the channel monitor 9 extends, under control, the time period to hold the weight value $\phi1$ in preparation for the packet data to be re-transmitted from the base station (i.e., for the packet data not received properly), and holds the weight value $\phi1$ for more than a predetermined time period.

Figure 8:
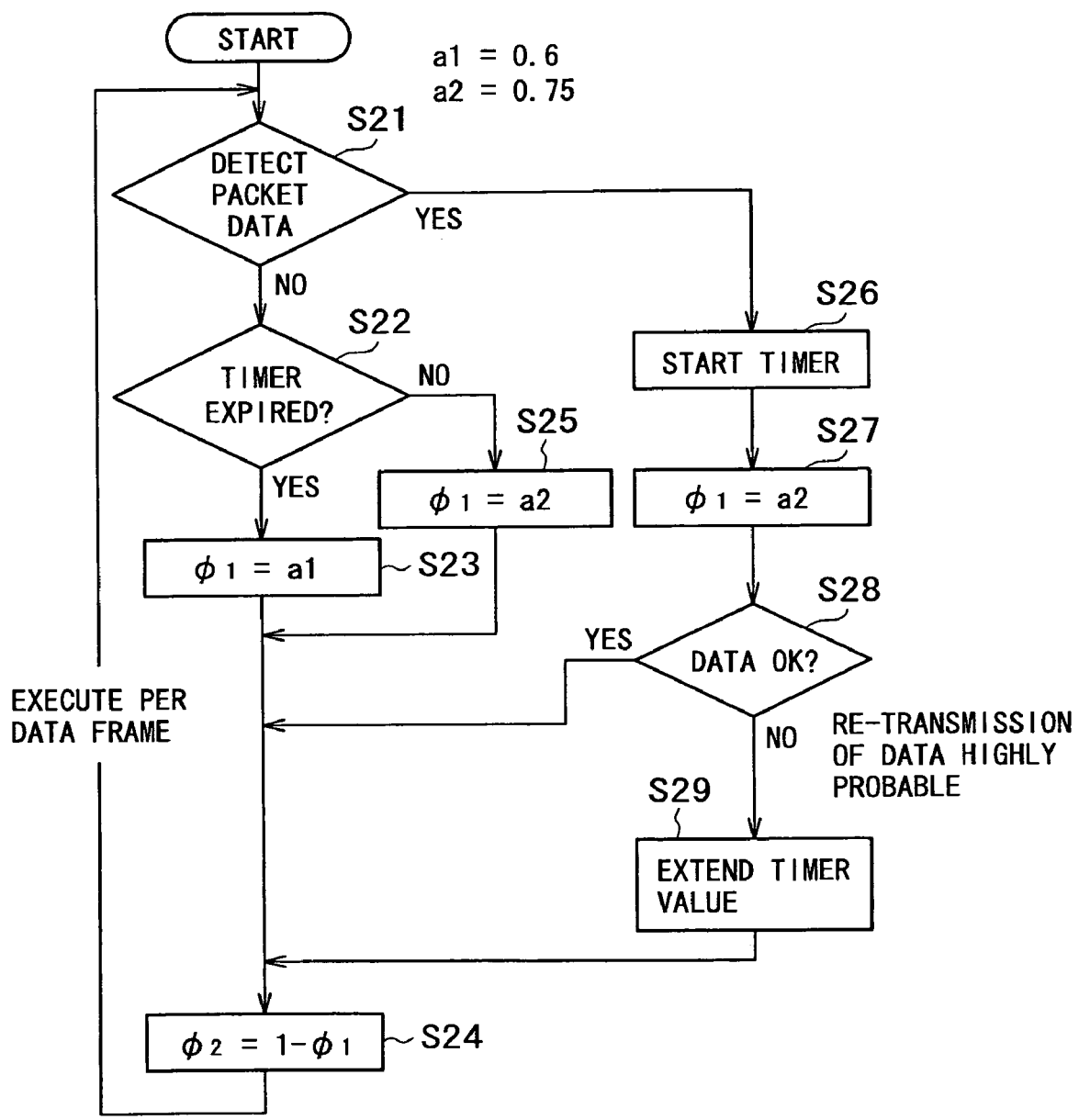
FIG. 8 is a flowchart for explaining a flow of the operation to set a weight value in the mobile telephone of the second embodiment.

The flowchart of FIG. 8 shows a flow of the operation performed by the channel monitor 9. In this flowchart, the operation starts when a main power source of the mobile telephone is turned on. At step S21, the channel monitor 9 makes a decision as to whether any indicator supplied from the indicator extractor 50 exists or not, thereby executing a detection to determine whether the packet data have been received or not.

In case the result of this detection signifies that no packet data have been received, the channel monitor 9 makes a decision at step S22 as to whether the time is over or not. That is, since the packet data are transmitted intermittently from the base station as described, the channel monitor 9 starts to clock the packet data at the timing of the reception by means of a timer (step S26), and holds the weight value $\phi1$ during a predetermined time period (e.g., several seconds) clocked by the timer.

Therefore, at step S22, the channel monitor 9 makes a decision as to whether the predetermined time period clocked by the timer has elapsed or not after a detection of the absence of the packet data. Upon the lapse of the predetermined time period clocked by the timer, since the possibility of subsequent transmission of further packet data from the base station is low, the channel monitor 9 sets, at step S23, a predetermined small value such as, e.g., 0.6 (a1=0.6) to the weight value $\phi1$ so that the antenna weight values W1 and W2 for the line switching data can be calculated in the antenna weight calculator 10, and then supplies the weight value $\phi1$ to the antenna weight calculator 10.

Next at step S24, the channel monitor 9 adjusts the weight value $\phi2$ in such a manner that the result of adding the small weight value $\phi1$ to the weight value $\phi2$, which is used to calculate the antenna weight values W1 and W2 for the line switching data, becomes "1" (i.e., $\phi2=1-\phi1$), and then supplies the adjusted value to the antenna weight calculator 10.

Consequently, as mentioned above, the antenna weight calculator 10 calculates the antenna weight values W1 and W2 on the basis of the weight values $\phi1$ and $\phi2$ in a manner to execute the data processing that weights the line switching data in the receiving circuits 3 and 4.

Meanwhile, if the predetermined time period clocked by the timer has not elapsed yet, it is highly probable that the packet data will be transmitted in succession from the base station When the packet data are initially received, the channel monitor 9 sets, as the weight value $\phi1$, a predetermined great value such as, e.g., 0.75 (a1=0.75) used in the antenna weight calculator 10 to calculate the antenna weight values W1 and W2 for the packet data.

Therefore, in a case where the result of the decision at step S22 signifies that the predetermined time period clocked by the timer has not elapsed yet, the channel monitor 9 holds, at step S25, the preceding weight value $\phi1$ at the predetermined great value of, for example, 0.75 as a weight value to calculate the antenna weight values W1 and W2 for the packet data.

At step S24, the channel monitor 9 adjusts the weight value $\phi2$ in such a manner that the result of adding the great weight value $\phi1$ thus held to the weight value $\phi2$ becomes "1" ($\phi2=1-\phi1$), and then supplies these values to the antenna weight calculator 10.

Consequently, as mentioned above, the antenna weight calculator 10 calculates the antenna weight values W1 and W2 on the basis of the weight values $\phi1$ and $\phi2$ in a manner to execute the data processing that weights the packet data in the receiving circuits 3 and 4.

Meanwhile, in a case where the received packet data have been detected at step S21, the channel monitor 9 starts the timer, at step S26, to clock the predetermined time period upon detection of the packet data.

At step S27, the channel monitor 9 sets, as the weight value $\phi1$, a predetermined great value (a2) such as, e.g., 0.75 for the packet data, and then supplies the weight value $\phi1$ to the antenna weight calculator 10.

Subsequently at step S28, the channel monitor 9 makes a decision as to whether proper reception of the packet data has been performed or not on the basis of the flag obtained from the decoder 33 of the third receiving circuit 5 which executes restoration of the packet data. In the case of proper reception of the packet data, the channel monitor 9 sets, at step S24, the weight value $\phi2$ corresponding to the weight value $\phi1$ set at step S25, and then supplies these values to the antenna weight calculator 10.

Meanwhile, if the packet data have not been received properly, a request for re-transmission of the packet data is sent from the mobile telephone to the base station as mentioned. It is highly probable that, in response to such a request for re-transmission, the packet data will be transmitted immediately from the base station.

Therefore, at step S29, the channel monitor 9 extends the preset clock time period of the timer by a predetermined length. Accordingly, upon re-transmission of the packet data from the base station, the re-transmitted packet data can be processed according to the optimal weight value 1.

Figure 9:
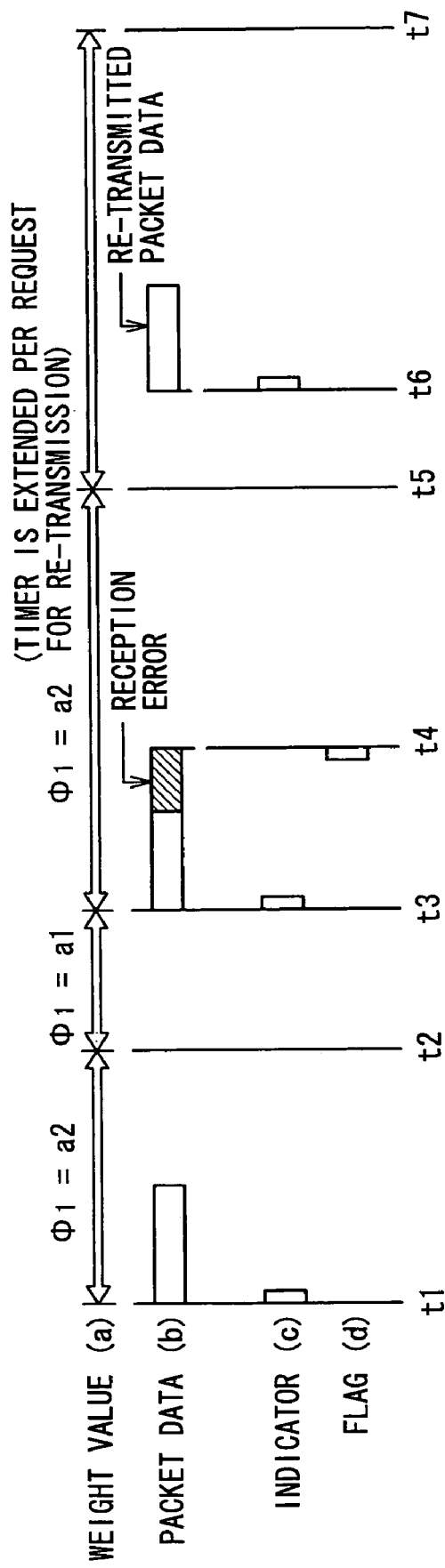
FIG. 9 is a time chart for explaining the operation to switch the weight values of packet data in the mobile telephone of the second embodiment.
Figure 10:
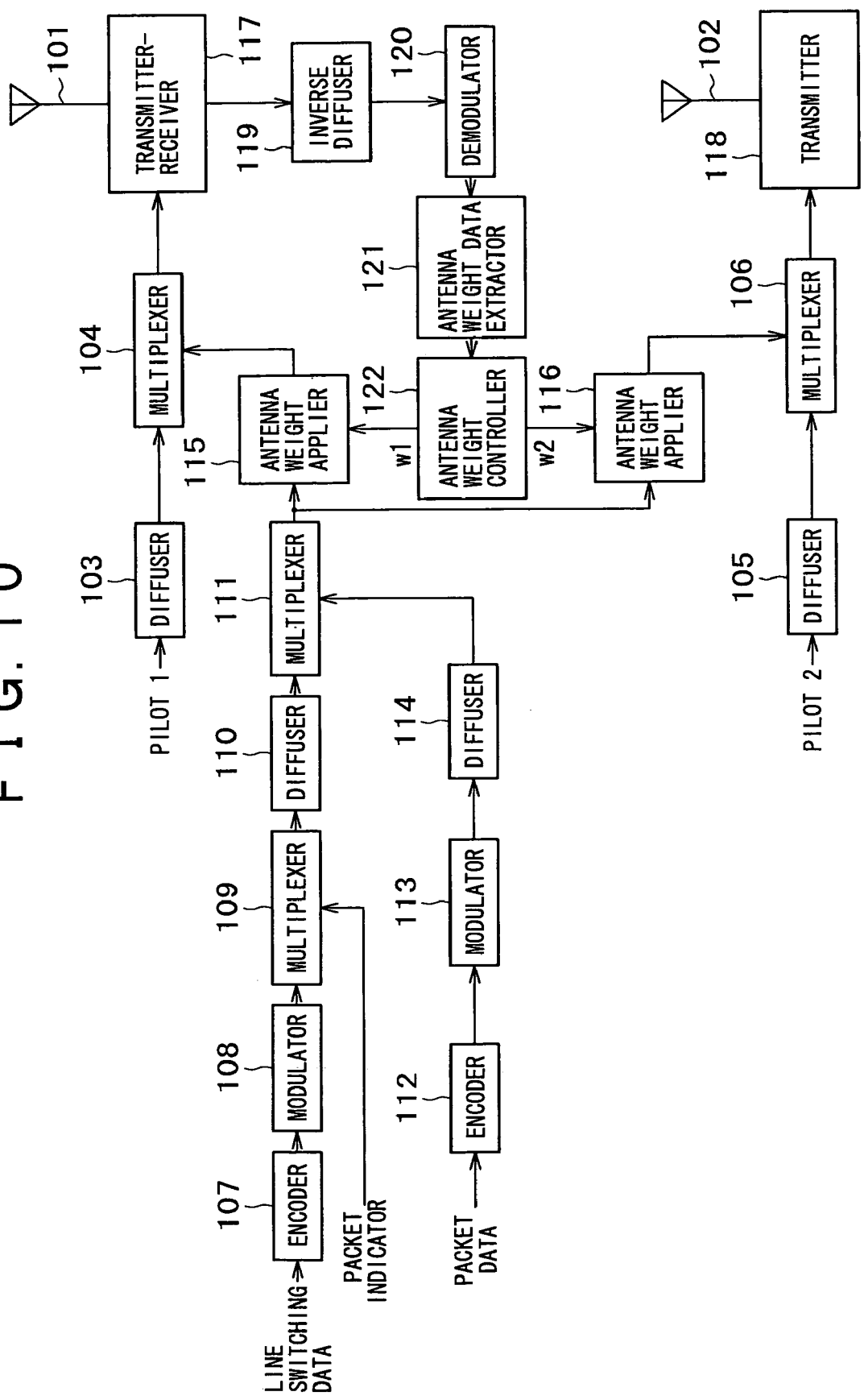
FIG. 10 is a block diagram showing the structure of a base station where a transmission antenna diversity is applied.
Figure 16:
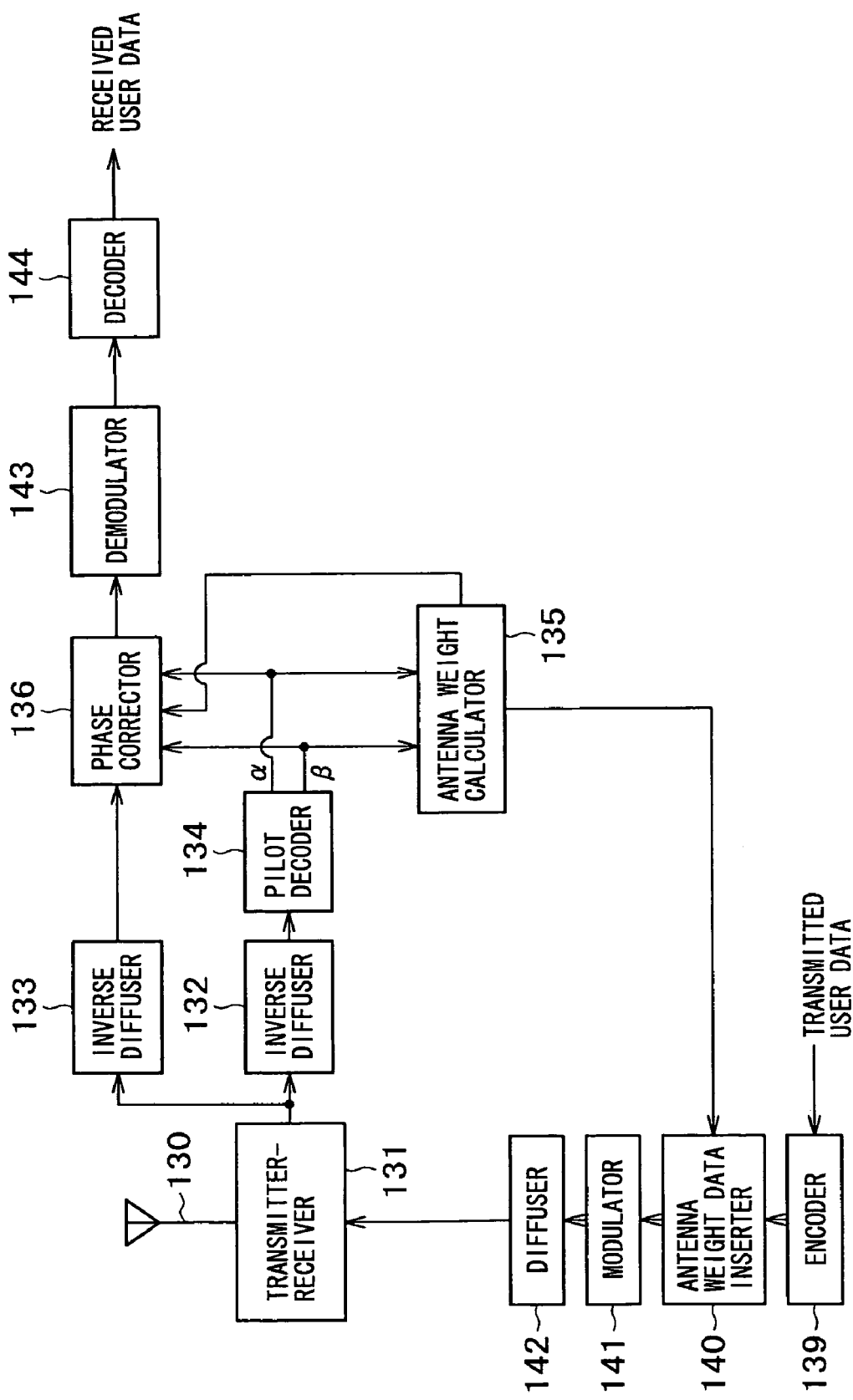
FIG. 16 is a block diagram of a user's terminal device to a base station where a transmission antenna diversity is employed.
Figure 17:
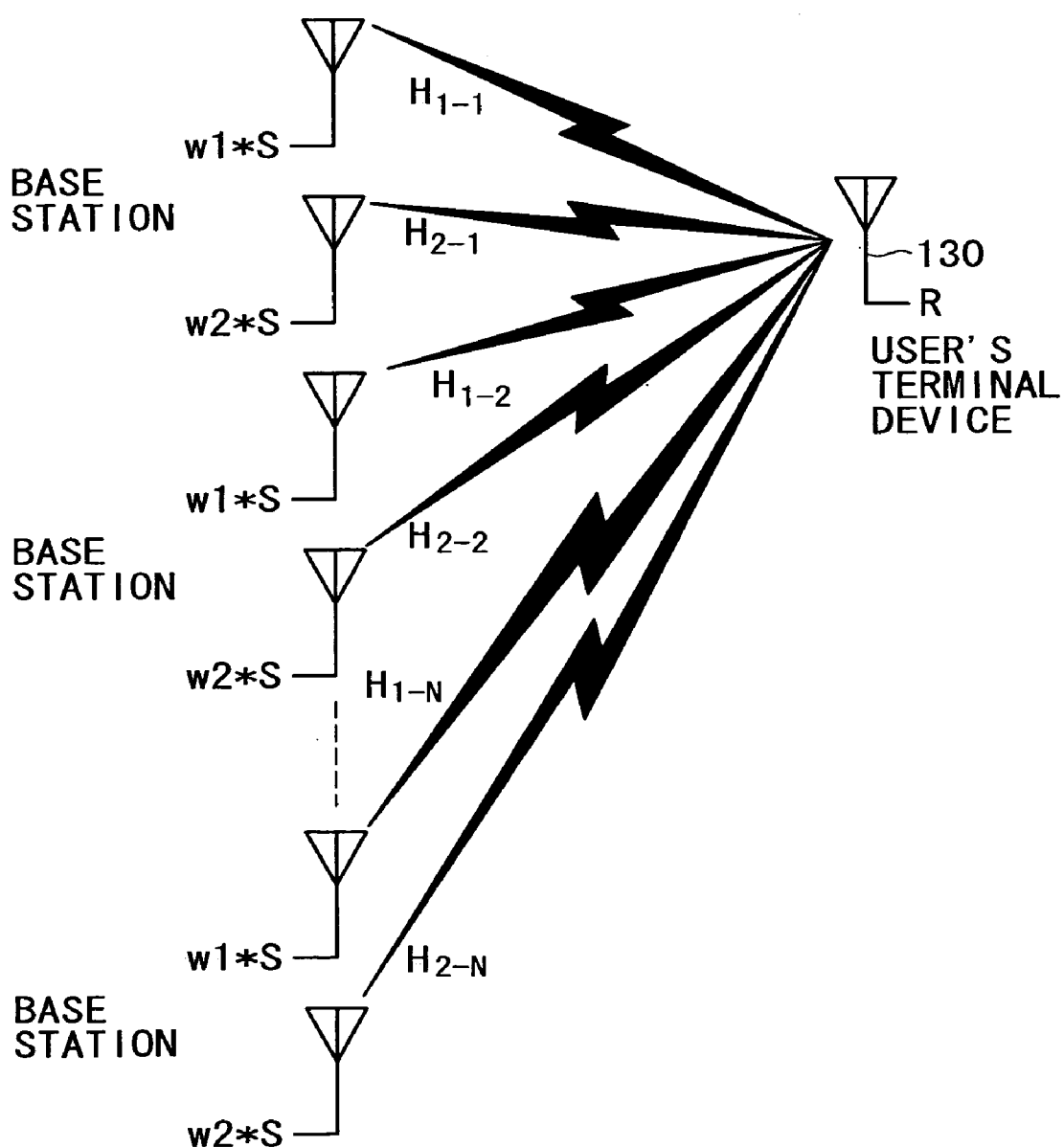
FIG. 17 is a diagram schematically showing a mobile communication system which adopts site diversity (soft handoff) technology.
Figure 18:
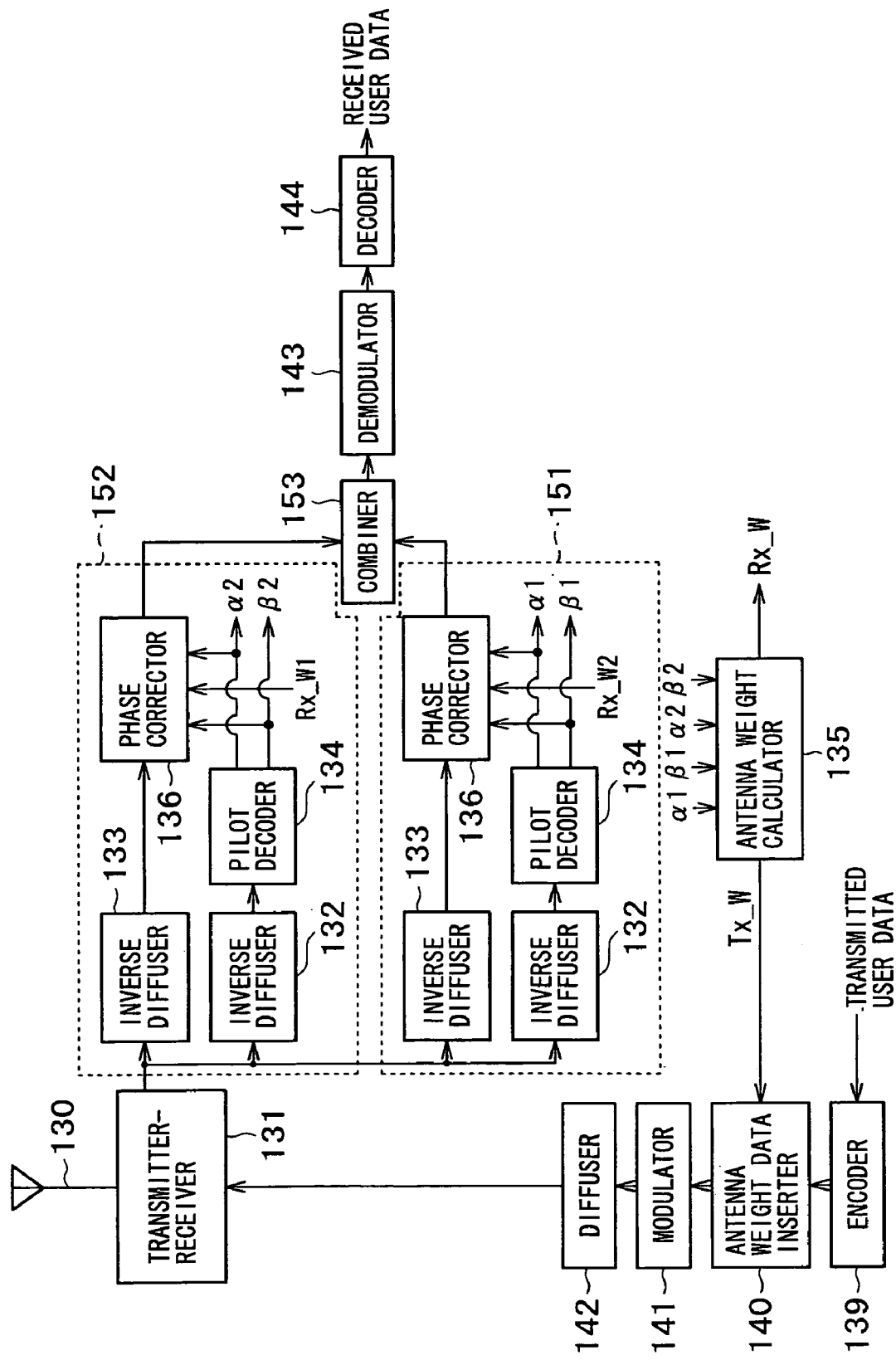
FIG. 18 is a block diagram of a user's terminal device adapted for a mobile communication system employing a site diversity.
Figure 19:
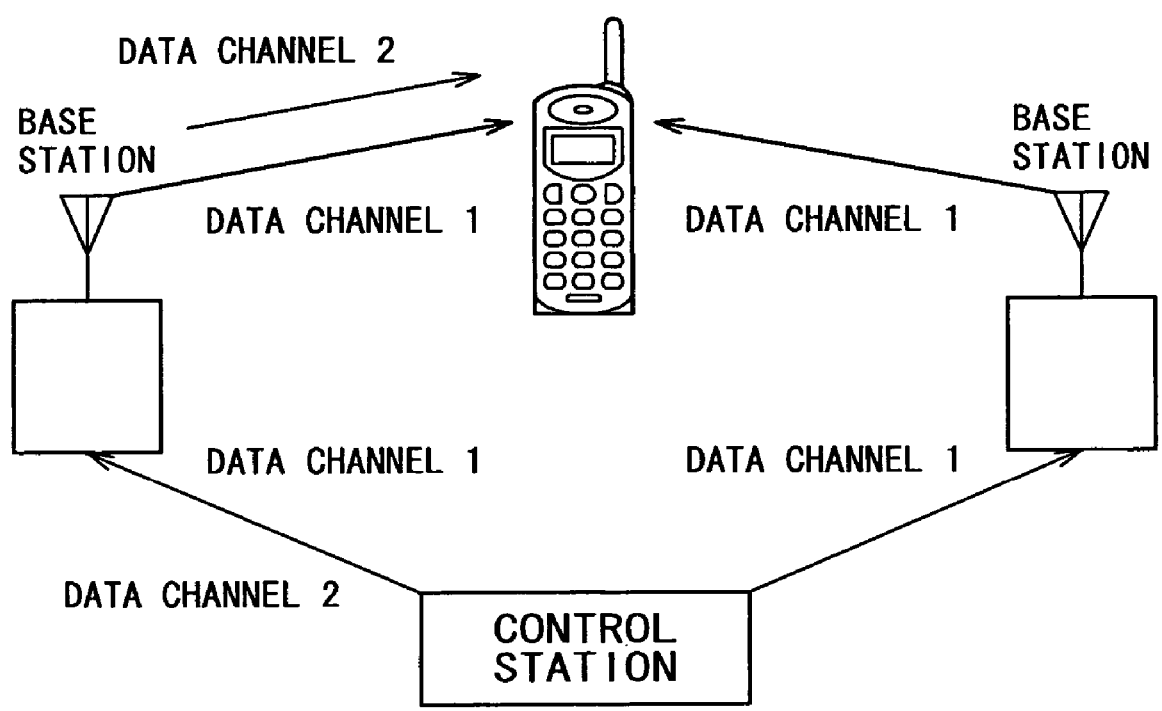
FIG. 19 is a diagram for explaining line switching data transmitted from plural base stations and packet data transmitted from a single base station.

Diagrams (a) to (d) of FIG. 9 ashow how the weight values $\phi1$ and $\phi2$ are variably controlled as described. Out of these diagrams, (a) of FIG. 9 shows the weight value $\phi1$ set by the channel monitor 9; (b) of FIG. 9 shows the timing to receive the packet data; (c) of FIG. 9 shows the timing to supply the detected indicator from the indicator extractor 50 to the channel monitor 9; and (d) of FIG. 9 shows the timing to supply a flag, which is indicative of a reception error, from the decoder 33 to the channel monitor 9 when any reception error has been caused in the packet data.

Suppose now that, in the diagrams of (a) to (d) of FIG. 9, the packet data are first received at time t1 as shown in (b) of FIG. 9, and the indicator extracted by the decoder 33 at the timing of such reception is then supplied to the channel monitor 9. In response to the indicator thus supplied, the channel monitor 9 selects the weight value a2 ($\phi1=a2$) for the packet data as described and then supplies the selected weight value a2 to the antenna weight calculator 10. Subsequently, as shown in (a) of FIG. 9, the channel monitor 9 holds the packet data weight value a2 for a predetermined period from time t1 to time t2.

Thereafter, when the time period to hold the packet data weight value a2 has expired at time t2 as shown in (a) of FIG. 9, the channel monitor 9 changes the packet data weight value from a2 to a1 at the timing of such expiration, and supplies the weight value a1 to the antenna weight calculator 10.

Next, as shown at time t3 in (b) and (c) of FIG. 9, the channel monitor 9 changes the packet data weight value again to a2 at the timing of reception of the packet data and supply of the indicator, and then supplies the weight value a2 to the antenna weight calculator 10.

[Operation for Extending Timer]

As expressed by oblique lines in (b) of FIG. 9, upon occurrence of a reception error due to a dropout of the latter portion of the packet data received at time t3, a flag indicative of such a reception error is supplied from the decoder 33 to the channel monitor 9, as shown at time t4 in (d) of FIG. 9.

Upon reception of the packet data at time t3 in (b) of FIG. 9, the channel monitor 9 supplies the weight value a2 to the antenna weight calculator 10 for a predetermined period from time t3 to time t5 in (a) of FIG. 9. However, if a flag indicative of a reception error is supplied, the channel monitor 9 extends the time period predetermined to hold the weight value a2, i.e., from time t5 to time t7 as shown in (a) of FIG. 9.

Consequently, the packet data re-transmitted due to the occurrence of a reception error can be received within the extended time period as denoted by time t6 in (b) of FIG. 9, whereby the data can be processed according to the optimal weight value a2.

[Effects of Second Embodiment]

As is obvious from the explanation given above, the mobile telephone of the second embodiment selectively changes, under control, the weight values φ1 and φ2 supplied to the antenna weight calculator 10, in accordance with the states of the packet data (the presence or absence of the packet data, the possibility of receiving the packet data, any reception error regarding the packet data, etc.).

As a result, it becomes possible to process the packet data according to the optimal weight value to eventually attain improvement in the reception quality of the mobile telephone.

With respect to the weight values described above, either the weight value for processing the packet data or the weight value for processing the line switching data may be used selectively in accordance with the aforementioned states of the packet data. In the explanation given above in connection with the second embodiment, the weight value φ1 is implied to have a concrete numerical value such as 0.6 or 0.75, but this value may be set adaptively in conformity with the design and so forth.

It is to be understood here that each of the above embodiments represents a mere example. Therefore, the present invention is not limited to such embodiments alone, and it is a matter of course that a variety of other changes and modifications may be contrived in conformity with the design and so forth without departing from the technical concept of the present invention.

INDUSTRIAL APPLICABILITY

The present invention is capable of assigning an optimal antenna weight value to each channel of a user's terminal device adapted for a site diversity to communicate with a plurality of base stations, thereby achieving improvement in the reception characteristics of the terminal device.

The invention claimed is:

1. A wireless transmitter-receiver device for receiving signals transmitted from a plurality of base stations having antennas, then calculating antenna weight values of the plural antennas on the basis of the received signals, and transmitting the calculated antenna weight values to the base stations, said transmitter-receiver device comprising:

a plurality of receiving means for respectively restoring, by the use of the antenna weight values, line switching data and/or packet data transmitted from the plurality of base stations;

antenna weight value variable control means for setting the antenna weight values in accordance with the relative data quantities of the line switching data and/or the packet data respectively restored by said plurality of receiving means; and transmitting means for transmitting to said plurality of base stations the antenna weight values set by said antenna weight value variable control means.

2. The wireless transmitter-receiver device according to claim 1, wherein said antenna weight value variable control means sets a relatively higher antenna weight value to the receiving means which restores the data of a quantity that is large relatively to other ones of the plurality of receiving means.

3. A wireless transmitter-receiver device for receiving signals transmitted from a plurality of base stations having antennas, then calculating antenna weight values of the plural antennas on the basis of the received signals, and transmitting the calculated antenna weight values to the base stations, said transmitter-receiver device comprising:

a plurality of receiving means for respectively restoring, by the use of the antenna weight values, line switching data and/or packet data transmitted from the plurality of base stations;

packet data reception detecting means for detecting reception of the packet data;

antenna weight value variable control means for setting the antenna weight values, according to the state of the packet data, to the plurality of receiving means for restoration of the packet data, in response to a detection of the reception of the packet data by said packet data reception detecting means; and transmitting means for transmitting to said plurality of base stations the antenna weight values set by said antenna weight value variable control means.

4. The wireless transmitter-receiver device according to claim 3, further comprising hold time setting means for setting a time period to hold the antenna weight value used for the packet data, wherein said antenna weight value variable control means sets the antenna weight value, which is used for the line switching data, to each receiving means in case the packet data is not detected by said packet data reception detecting means within the time period set by said hold time setting means.

5. The wireless transmitter-receiver device according to claim 3 or 4, further comprising hold time setting means for setting a time period to hold the antenna weight value used for the packet data, wherein said antenna weight value variable control means sets the antenna weight value, which is used for the line switching data, to each receiving circuit in case the packet data is not detected by said packet data reception detecting means within the time period set by said hold time setting means.

6. The wireless transmitter-receiver device according to claim 4, further comprising:

reception error detecting means for detecting a reception error of the packet data; and extension setting means for setting an extension of the time period set to hold the antenna weight value by said hold time setting means, in response to a detection of any reception error of the packet data by said reception error detecting means.

7. The wireless transmitter-receiver device according to any of claims 3 to 4, wherein said packet data reception detecting means detects the presence or absence of reception of the packet data by detecting an indicator which is attached to the packet data and indicates the presence or absence of the data at least in the packet data.

8. The wireless transmitter-receiver device according to claim 5, further comprising:
   reception error detecting means for detecting a reception error of the packet data; and
   extension setting means for setting an extension of the time period set to hold the antenna weight value by said hold time setting means, in response to a detection of any reception error of the packet data by said reception error detecting means.

9. The wireless transmitter-receiver device according to claim 5, wherein said packet data reception detecting means detects the presence or absence of reception of the packet data by detecting an indicator which is attached to the packet data and indicates the presence or absence of the data at least in the packet data.

10. The wireless transmitter-receiver device according to claim 6, wherein said packet data reception detecting means detects the presence or absence of reception of the packet data by detecting an indicator which is attached to the packet data and indicates the presence or absence of the data at least in the packet data.

* * * * *

UNITED STATES PATENT AND TRADEMARK OFFICE
CERTIFICATE OF CORRECTION

| | |
|---|---|
| PATENT NO. | : 7,200,422 B2 |
| APPLICATION NO. | : 10/499203 |
| DATED | : April 3, 2007 |
| INVENTOR(S) | : Katsutoshi Itoh |

It is certified that error appears in the above-identified patent and that said Letters Patent is hereby corrected as shown below:

On the title page item (54), and col. 1, Line 1, should read -- WIRELESS TRANSMITTER-RECEIVER DEVICE --.

Signed and Sealed this

Twenty-seventh Day of May, 2008

JON W. DUDAS
*Director of the United States Patent and Trademark Office*